United States Patent
Ji et al.

(10) Patent No.: US 9,897,171 B2
(45) Date of Patent: Feb. 20, 2018

(54) PLANETARY GEAR TRAIN OF AUTOMATIC TRANSMISSION FOR VEHICLE

(71) Applicant: HYUNDAI MOTOR COMPANY, Seoul (KR)

(72) Inventors: Seongwook Ji, Gunpo-si (KR); Seong Wook Hwang, Gunpo-si (KR); Woo Jin Chang, Suwon-si (KR); Wonmin Cho, Hwaseong-si (KR); Hyun Sik Kwon, Seoul (KR); Jae Chang Kook, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/257,173

(22) Filed: Sep. 6, 2016

(65) Prior Publication Data

US 2017/0261076 A1 Sep. 14, 2017

(30) Foreign Application Priority Data

Mar. 8, 2016 (KR) .......................... 10-2016-0027656

(51) Int. Cl.
*F16H 3/66* (2006.01)

(52) U.S. Cl.
CPC ....... *F16H 3/66* (2013.01); *F16H 2200/0069* (2013.01); *F16H 2200/201* (2013.01); *F16H 2200/2048* (2013.01)

(58) Field of Classification Search
CPC ............... F16H 3/66; F16H 2200/2048; F16H 2200/201; F16H 2200/0069

USPC .................................................. 475/275–291
See application file for complete search history.

(56) References Cited

U.S. PATENT DOCUMENTS

| | | | | |
|---|---|---|---|---|
| 5,030,186 | A * | 7/1991 | Asada ..................... | F16H 3/666 475/278 |
| 5,088,349 | A * | 2/1992 | Asada ..................... | F16H 61/04 475/123 |
| 2002/0183154 | A1* | 12/2002 | Ziemer .................. | B60K 6/365 475/5 |
| 2006/0046892 | A1* | 3/2006 | Bucknor ................ | F16H 3/66 475/282 |
| 2007/0010367 | A1* | 1/2007 | Raghavan ............. | F16H 3/66 475/275 |
| 2009/0143187 | A1* | 6/2009 | Hiramatsu ............. | F16H 3/66 475/282 |

FOREIGN PATENT DOCUMENTS

| | | | |
|---|---|---|---|
| JP | 2009-222070 A | 10/2009 | |
| JP | 2011-69472 | 7/2011 | |
| KR | 10-2009-0126112 | 8/2009 | |
| KR | 20090126973 A * | 12/2009 | ............. F16H 3/666 |
| KR | 10-2012-0121158 A | 11/2012 | |

* cited by examiner

*Primary Examiner* — Roger L Pang
(74) *Attorney, Agent, or Firm* — Brinks Gilson & Lione

(57) ABSTRACT

The present disclosure provides a planetary gear train of an automatic transmission for a vehicle to perform ten or more forward speeds and one or more reverse speed. The planetary gear train includes: an input shaft, an output shaft, three planetary gear sets respectively having three rotational elements, and seven control elements for selectively interconnecting the rotational elements and a transmission housing.

8 Claims, 2 Drawing Sheets

FIG. 2

| Shift-stage | Control element | | | | | | | Gear ratio |
|---|---|---|---|---|---|---|---|---|
| | C1 | C2 | C3 | C4 | C5 | B1 | B2 | |
| D1 | | ● | | ● | | | ● | 5.800 |
| D2 | | | ● | ● | | | ● | 2.920 |
| D3 | ● | | ● | | | | ● | 2.200 |
| D4 | | | ● | | | ● | ● | 1.760 |
| D5 | | | ● | | ● | | ● | 1.160 |
| D6 | | ● | ● | | ● | | | 1.000 |
| D7 | | ● | | | ● | ● | | 0.839 |
| D8 | | | ● | ● | ● | ● | | 0.800 |
| D9 | | ● | | ● | | ● | | 0.750 |
| D10 | | | ● | ● | ● | ● | | 0.600 |
| REV | | ● | | | ● | | ● | 3.000 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0027656, filed on Mar. 8, 2016, the entire contents of which are incorporated herein by reference.

FIELD

The present disclosure relates to an automatic transmission for a vehicle.

BACKGROUND

The statements in this section merely provide background information related to the present disclosure and may not constitute prior art.

Recently, increase of oil price is triggering a hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to enhance fuel consumption, an automatic transmission has more shift stages. It is important for better efficiency to be derived by a smaller number of parts.

In this respect, an eight-speed automatic transmission has been recently introduced, and a planetary gear train for an automatic transmission enabling more shift stages is under investigation.

The above information disclosed in this section is only for enhancement of understanding of the background of the present disclosure and therefore it may contain information that does not form the prior art that is already known in this country to a person of ordinary skill in the art.

SUMMARY

The present disclosure provides a planetary gear train of an automatic transmission for a vehicle having advantages of obtaining shift-stages of at least the ten forward speeds and at least one reverse speed by reduced number of parts, improving power delivery performance and fuel consumption by multi-stages of an automatic transmission, and also improving installability by decreasing a length of the transmission, and providing benefit in weight.

A planetary gear train according to one form of the present disclosure includes: an input shaft for receiving an engine torque; an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; a first shaft connected with the first rotational element; a second shaft connected with the second rotational element and directly connected with the input shaft; a third shaft connecting the third rotational element and the seventh rotational element and selectively connected with the second shaft; a fourth shaft connected with the fourth rotational element, and selectively connected with the first shaft and the second shaft, respectively; a fifth shaft connected with the fifth rotational element, and selectively connected with the third shaft; a sixth shaft interconnecting the sixth rotational element and the eighth rotational element and directly connected with the output shaft; and a seventh shaft connected with the ninth rotational element, and selectively connected with the fifth shaft.

The first shaft and the seventh shaft may be respectively selectively connected with a transmission housing.

The first, second, and third rotational elements of the first planetary gear set may be respectively a first sun gear, a first planet carrier, and a first ring gear of the first planetary gear set. The fourth, fifth, and sixth rotational elements of the second planetary gear set may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set.

A planetary gear train according to one form of the present disclosure may further include: a first clutch selectively connecting the second shaft and the third shaft; a second clutch selectively connecting the second shaft and the fourth shaft; a third clutch selectively connecting the first shaft and the fourth shaft; a fourth clutch selectively connecting the third shaft and the fifth shaft; a fifth clutch selectively connecting the fifth shaft and the seventh shaft; a first brake selectively connecting the first shaft and the transmission housing; and a second brake selectively connecting the seventh shaft and the transmission housing.

According to another form of the present disclosure, shift-stages of at least ten forward speeds and at least one reverse speed may be realized by combination of three planetary gear sets of simple planetary gear sets and seven control elements.

In addition, a planetary gear train according to the present disclosure may substantially improve driving stability by realizing shift-stages appropriate to rotation speed of an engine due to multi-stages of an automatic transmission.

In addition, a planetary gear train according to the present disclosure may improve engine driving efficiency by multi-stages of an automatic transmission, and may improve power delivery performance and fuel consumption.

Further, effects that can be obtained or expected from the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart for respective control elements at respective shift-stages in a planetary gear train.

Figure 1:
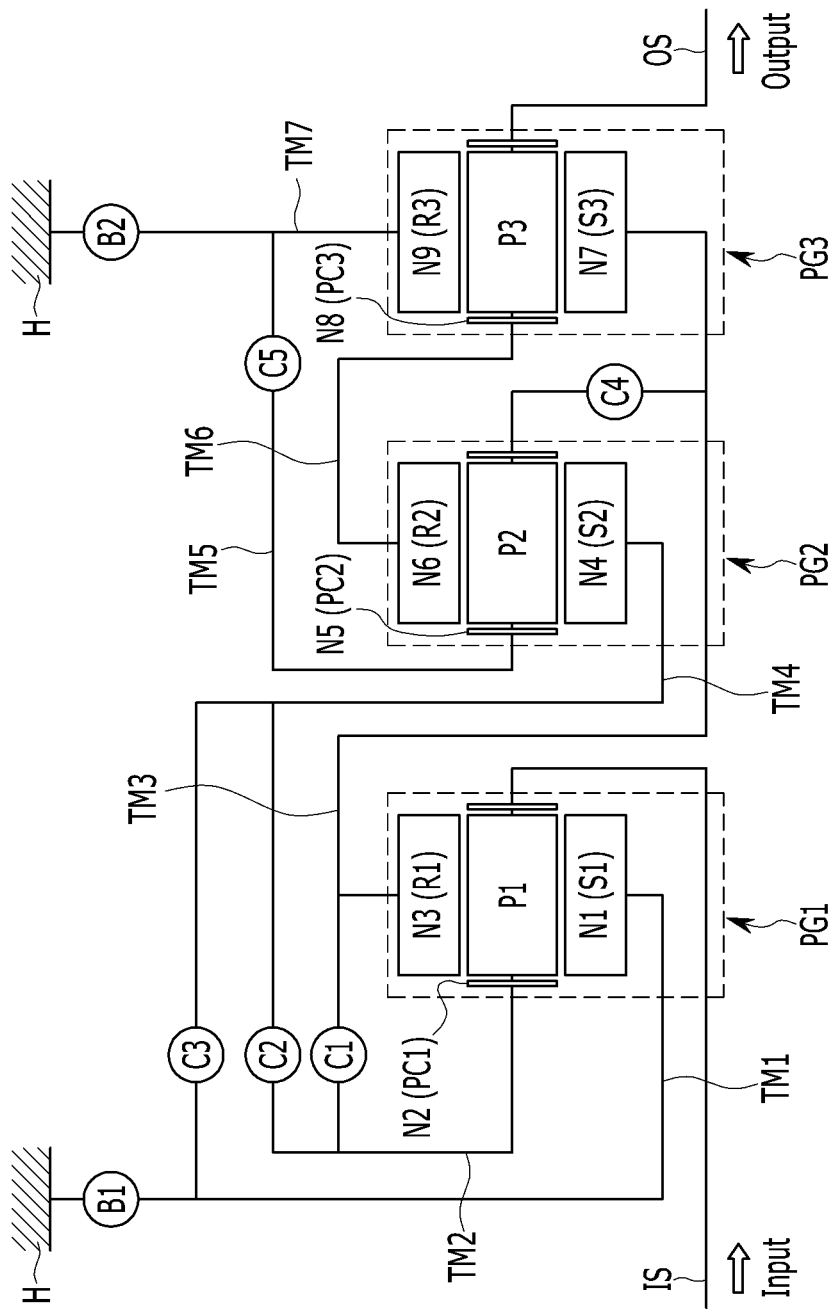
FIG. 1 is a schematic diagram of a planetary gear train.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second, and the like is to divide the names because the names of the components are the same as each other and an order thereof is not particularly limited.

FIG. 1 is a schematic diagram of a planetary gear train according to one form of the present disclosure.

Referring to FIG. 1, a planetary gear train includes: first, second, and third planetary gear sets PG1, PG2, and PG3 arranged on a same axis, an input shaft IS, an output shaft OS, seven shafts TM1 to TM7 interconnecting rotational elements of the first, second, and third planetary gear sets PG1, PG2, and PG3, five clutches C1 to C5 and two brakes B1 and B2 as control elements, and a transmission housing H.

Torque input from the input shaft IS is shifted by cooperative operation of the first, second, and third planetary gear sets PG1, PG2, and PG3, and then output through the output shaft OS.

The planetary gear sets are arranged in the order of first, second, and third planetary gear sets PG1, PG2, and PG3, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted driving torque to a drive shaft through a differential apparatus.

The first planetary gear set PG1 is a single pinion planetary gear set, and includes a SS, a first planet carrier PC1 that supports first pinion gear P1 externally engaged with the first sun gear S1, and a first ring gear R1 that is internally engaged with the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a SS, a second planet carrier PC2 that supports second pinion gear P2 externally engaged with the second sun gear S2, and a second ring gear R2 that is internally engaged with the second pinion gear P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a SS, a third planet carrier PC3 that supports third pinion gear P3 externally engaged with the third sun gear S3, and a third ring gear R3 that is internally engaged with the third pinion gear P3. The third sun gear S3 acts as a seventh rotational element N7, the third planet carrier PC3 acts as a eighth rotational element N8, and the third ring gear R3 acts as a ninth rotational element N9.

In the arrangement of the first, second, and third planetary gear sets PG1, PG2, and PG3, the third rotational element N3 is directly connected with the seventh rotational element N7, the sixth rotational element N6 is directly connected with the eighth rotational element N8, by seven shafts TM1 to TM7.

The seven shafts TM1 to TM7 are arranged as follows.

Each of the seven shafts TM1 to TM7 may be a rotational member that always interconnects the input and output shafts and rotational elements of the planetary gear sets PG1, PG2, and PG3, or may be a fixed member fixed to the transmission housing H.

The first shaft TM1 is connected with the first rotational element N1 (first sun gear S1), and selectively connected with the transmission housing H, thereby selectively acting as a fixed element.

The second shaft TM2 is connected with the second rotational element N2 (first planet carrier PC1), and directly connected with the input shaft IS, thereby always acting as an input element.

The third shaft TM3 directly connects the third rotational element N3 (the first ring gear R1) and the seventh rotational element N7 (the third sun gear S3), and is selectively connected with the second shaft TM2.

The fourth shaft TM4 is connected with the fourth rotational element N4 (second sun gear S2), and selectively connected with the first shaft TM1 and the second shaft TM2, respectively.

The fifth shaft TM5 is connected with the fifth rotational element N5 (second planet carrier PC2), and selectively connected with the third shaft TM3.

The sixth shaft TM6 directly connects the sixth rotational element N6 (the second ring gear R2) and the eighth rotational element N8 (the third planet carrier PC3), and is directly connected with the output shaft OS, thereby always acting as an output element.

The seventh shaft TM7 is connected with the ninth rotational element N9 (third ring gear R3), selectively connected with the fifth shaft TM5, and selectively connected with the transmission housing H, thereby selectively acting as a fixed element, The seven shafts TM1 to TM7, the input shaft IS, and the output shaft OS may be selectively interconnected with one another by control elements of five clutches C1, C2, C3, C4, and C5.

The seven shafts TM1 to TM7 may be selectively connected with the transmission housing H, by control elements of two brake B1 and B2.

The five clutches C1 to C5 and the two brakes B1 and B2 are arranged as follows.

The first clutch C1 is arranged between the second shaft TM2 and the third shaft TM3, and selectively connects the second shaft TM2 and the third shaft TM3, thereby controlling power delivery therebetween.

The second clutch C2 is arranged between the second shaft TM2 and the fourth shaft TM4, and selectively connects the second shaft TM2 and the fourth shaft TM4, thereby controlling power delivery therebetween.

The third clutch C3 is arranged between the first shaft TM1 and the fourth shaft TM4, and selectively connects the first shaft TM1 and the fourth shaft TM4, thereby controlling power delivery therebetween.

The fourth clutch C4 is arranged between the third shaft TM3 and the fifth shaft TM5, and selectively connects the third shaft TM3 and the fifth shaft TM5, thereby controlling power delivery therebetween.

The fifth clutch C5 is arranged between the fifth shaft TM5 and the seventh shaft TM7, and selectively connects the fifth shaft TM5 and the seventh shaft TM7, thereby controlling power delivery therebetween.

The first brake B1 is arranged between the first shaft TM1 and the transmission housing H, and selectively connects the first shaft TM1 to the transmission housing H.

The second brake B2 is arranged between the seventh shaft TM7 and the transmission housing H, and selectively connects the seventh shaft TM7 to the transmission housing H.

The control elements of the first, second, third, fourth, and fifth clutches C1, C2, C3, C4, and C5 and the first and second brakes B1 and B2 may be realized as multi-plate hydraulic pressure friction devices that are frictionally engaged by hydraulic pressure.

FIG. 2 is an operational chart for respective control elements at respective shift-stages in a planetary gear train according to one form of the present disclosure.

Referring to FIG. 2, a planetary gear train according to the present disclosure realizes ten forward speeds and one reverse speed by operating three control elements among the first, second, third, fourth, and fifth clutches C1, C2, C3, C4, and C5 and the first and second brakes B1 and B2 at respective shift-stages.

In the forward first speed shift-stage D1, the second and fourth clutches C2 and C4 and the second brakes B2 are simultaneously operated.

The second shaft TM2 and the fourth shaft TM4 are interconnected by the operation of the second clutch C2, and the third shaft TM3 is interconnected with the fifth shaft TM5 by the operation of the fourth clutch C4. In this state, torque of the Input shaft IS is input to the second shaft TM2, and the seventh shaft TM7 acts as a fixed element by the operation of the second brake B2, thereby realizing the forward first speed and outputting a shifted torque through the output shaft OS connected with the sixth shaft TM6.

In the forward second speed shift-stage D2, the third and fourth clutches C3 and C4 and the second brakes B2 are simultaneously operated.

The first shaft TM1 and the fourth shaft TM4 are interconnected by the operation of the third clutch C3, and the third shaft TM3 is interconnected with the fifth shaft TM5 by the operation of the fourth clutch C4. In this state, torque of the Input shaft IS is input to the second shaft TM2, and the seventh shaft TM7 acts as a fixed element by the operation of the second brake B2, thereby realizing the forward second speed and outputting a shifted torque through the output shaft OS connected with the sixth shaft TM6.

In the forward third speed shift-stage D3, the first and third clutches C1 and C3 and the second brakes B2 are simultaneously operated.

The second shaft TM2 and the third shaft TM3 are interconnected by the operation of the first clutch C1, and the first shaft TM1 is interconnected with the fourth shaft TM4 by the operation of the third clutch C3. In this state, torque of the Input shaft IS is input to the second shaft TM2, and the seventh shaft TM7 acts as a fixed element by the operation of the second brake B2, thereby realizing the forward third speed and outputting a shifted torque through the output shaft OS connected with the sixth shaft TM6.

In the forward fourth speed shift-stage D4, the third clutch C3 and the first and second brakes B1 and B2 are simultaneously operated.

The first shaft TM1 and the fourth shaft TM4 are interconnected by the operation of the third clutch C3. In this state, torque of the Input shaft IS is input to the second shaft TM2, and the first shaft TM1 and the seventh shaft TM7 act as a fixed element by the operation of the first and second brakes B1 and B2, thereby realizing the forward fourth speed and outputting a shifted torque through the output shaft OS connected with the sixth shaft TM6.

In the forward fifth speed shift-stage D5, the third and fifth clutches C3 and C5 and the second brakes B2 are simultaneously operated.

The first shaft TM1 and the fourth shaft TM4 are interconnected by the operation of the third clutch C3, and the fifth shaft TM5 is interconnected with the seventh shaft TM7 by the operation of the fifth clutch C5. In this state, torque of the Input shaft IS is input to the second shaft TM2, and the seventh shaft TM7 acts as a fixed element by the operation of the second brake B2, thereby realizing the forward fifth speed and outputting a shifted torque through the output shaft OS connected with the sixth shaft TM6.

In the forward sixth speed shift-stage D6, the second, third, and fifth clutches C2, C3, and C5 are simultaneously operated.

The second shaft TM2 and the fourth shaft TM4 are interconnected by the operation of the second clutch C2, the first shaft TM1 is interconnected with the fourth shaft TM4 by the operation of the third clutch C3, and the fifth shaft TM5 is interconnected with the seventh shaft TM7 by the operation of the fifth clutch C5.

In this case, entire planetary gear sets integrally rotate, and a torque inputted through the second shaft TM2 is outputted as inputted, thereby forming the forward sixth speed and outputting the inputted torque to the output shaft OS connected with the sixth shaft TM6.

In the forward seventh speed shift-stage D7, the second and fifth clutches C2 and C5 and the first brakes B1 are simultaneously operated.

The second shaft TM2 and the fourth shaft TM4 are interconnected by the operation of the second clutch C2, and the fifth shaft TM5 is interconnected with the seventh shaft TM7 by the operation of the fifth clutch C5. In this state, torque of the Input shaft IS is input to the second shaft TM2, and the first shaft TM1 acts as a fixed element by the operation of the first brake B1, thereby realizing the forward seventh speed and outputting a shifted torque through the output shaft OS connected with the sixth shaft TM6.

In the forward eighth speed shift-stage D8, the fourth and fifth clutches C4 and C5 and the first brakes B1 are simultaneously operated.

The third shaft TM3 and the fifth shaft TM5 are interconnected by the operation of the fourth clutch C4, and the fifth shaft TM5 is interconnected with the seventh shaft TM7 by the operation of the fifth clutch C5. In this state, torque of the Input shaft IS is input to the second shaft TM2, and the first shaft TM1 acts as a fixed element by the operation of the first brake B1, thereby realizing the forward eighth speed and outputting a shifted torque through the output shaft OS connected with the sixth shaft TM6.

In the forward ninth speed shift-stage D9, the second and fourth clutches C2 and C4 and the first brakes B1 are simultaneously operated.

The second shaft TM2 and the fourth shaft TM4 are interconnected by the operation of the second clutch C2, and the third shaft TM3 is interconnected with the fifth shaft TM5 by the operation of the fourth clutch C4. In this state, torque of the Input shaft IS is input to the second shaft TM2, and the first shaft TM1 acts as a fixed element by the operation of the first brake B1, thereby realizing the forward ninth speed and outputting a shifted torque through the output shaft OS connected with the sixth shaft TM6.

In the forward tenth speed shift-stage D10, the third and fourth clutches C3 and C4 and the first brakes B1 are simultaneously operated.

The first shaft TM1 and the fourth shaft TM4 are interconnected by the operation of the third clutch C3, and the third shaft TM3 is interconnected with the fifth shaft TM5 by the operation of the fourth clutch C4. In this state, torque of the Input shaft IS is input to the second shaft TM2, and the first shaft TM1 acts as a fixed element by the operation of the first brake B1, thereby realizing the forward tenth speed and outputting a shifted torque through the output shaft OS connected with the sixth shaft TM6.

In the reverse speed REV and the second and fifth clutches C2 and C5 and the second brakes B2 are simultaneously operated.

The second shaft TM2 and the fourth shaft TM4 are interconnected by the operation of the second clutch C2, and the fifth shaft TM5 is interconnected with the seventh shaft TM7 by the operation of the fifth clutch C5. In this state, torque of the Input shaft IS is input to the second shaft TM2, and the seventh shaft TM7 acts as a fixed element by the operation of the second brake B2, thereby realizing the reverse speed and outputting a reverse torque through the output shaft OS connected with the sixth shaft TM6.

As described above, a planetary gear train according to one form of the present disclosure may realize at least forward ten speeds and at least one reverse speed by operating three planetary gear sets PG1, PG2, and PG3 by controlling the five clutches C1, C2, C3, C4, and C5 and the two brake B1 and B2.

In addition, a planetary gear train according to the present disclosure may realize shift stages appropriate for rotation speed of an engine due to multi-stages of an automatic transmission and improve driving stability of a vehicle by utilizing a low rotation speed of an engine.

In addition, the planetary gear train improves engine driving efficiency by multi-stages of an automatic transmission, and may improve power delivery performance and fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2: first and second brakes
C1, C2, C3, C4, C5: first, second, third, fourth, and fifth clutches
PG1, PG2, PG3: first, second, and third planetary gear sets
S1, S2, S3: first, second, and third sun gears
PC1, PC2, PC3: first, second, and third planet carriers
R1, R2, R3: first, second, and third ring gears
IS: input shaft
OS: output shaft
TM1, TM2, TM3, TM4, TM5, TM6, TM7: first, second, third, fourth, fifth, sixth, and seventh shafts

What is claimed is:

1. A planetary gear train of an automatic transmission for a vehicle, comprising:
   an input shaft configured to receive an engine torque;
   an output shaft configured to output a shifted torque;
   a first planetary gear set having first, second, and third rotational elements;
   a second planetary gear set having fourth, fifth, and sixth rotational elements;
   a third planetary gear set having seventh, eighth, and ninth rotational elements;
   a first shaft fixedly connected with the first rotational element;
   a second shaft fixedly connected with the second rotational element and fixedly connected with the input shaft;
   a third shaft configured to fixedly connect the third rotational element and the seventh rotational element and selectively connected with the second shaft;
   a fourth shaft fixedly connected with the fourth rotational element, and selectively connected with the first shaft and the second shaft, respectively;
   a fifth shaft fixedly connected with the fifth rotational element, and selectively connected with the third shaft;
   a sixth shaft fixedly interconnecting the sixth rotational element and the eighth rotational element and fixedly connected with the output shaft; and
   a seventh shaft fixedly connected with the ninth rotational element, and selectively connected with the fifth shaft.

2. The planetary gear train of claim 1, wherein the first shaft and the seventh shaft are respectively selectively connected with a transmission housing.

3. The planetary gear train of claim 1, wherein
   the first, second, and third rotational elements of the first planetary gear set are respectively a first sun gear, a first planet carrier, and a first ring gear of the first planetary gear set;
   the fourth, fifth, and sixth rotational elements of the second planetary gear set are respectively a second sun gear, a second planet carrier, and a second ring gear of the second planetary gear set; and
   the seventh, eighth, and ninth rotational elements of the third planetary gear set are respectively a third sun gear, a third planet carrier, and a third ring gear of the third planetary gear set.

4. The planetary gear train of claim 2, further comprising:
   a first clutch selectively connecting the second shaft and the third shaft;
   a second clutch selectively connecting the second shaft and the fourth shaft;
   a third clutch selectively connecting the first shaft and the fourth shaft;
   a fourth clutch selectively connecting the third shaft and the fifth shaft;
   a fifth clutch selectively connecting the fifth shaft and the seventh shaft;
   a first brake selectively connecting the first shaft and the transmission housing; and
   a second brake selectively connecting the seventh shaft and the transmission housing.

5. A planetary gear train of an automatic transmission for a vehicle, comprising:
   an input shaft configured to receive an engine torque;
   an output shaft configured to output a shifted torque;
   a first planetary gear set having first, second, and third rotational elements;
   a second planetary gear set having fourth, fifth, and sixth rotational elements; and
   a third planetary gear set having seventh, eighth, and ninth rotational elements,
   wherein the input shaft is directly connected with the second rotational element;

the output shaft is directly connected with the eighth rotational element;

the second rotational element is selectively connected with the third rotational element;

the third rotational element is directly connected with the seventh rotational element;

the fourth rotational element is selectively connected with the first and second rotational elements, respectively, the fifth rotational element is selectively connected with the third rotational element;

the sixth rotational element is directly connected with the eighth rotational element; and the ninth rotational element is selectively connected with the fifth rotational element.

6. The planetary gear train of claim 5, wherein the first rotational element and the ninth rotational element are selectively connected with a transmission housing respectively.

7. The planetary gear train of claim 5, wherein the first, second, and third rotational elements of the first planetary gear set are respectively a first sun gear, a first planet carrier, a first ring gear of the first planetary gear set;

the fourth, fifth, and sixth rotational elements of the second planetary gear set are respectively a second sun gear, a second planet carrier, and a second ring gear of the second planetary gear set; and the seventh, eighth, and ninth rotational elements of the third planetary gear set are respectively a third sun gear, a third planet carrier, and a third ring gear of the third planetary gear set.

8. The planetary gear train of claim 6, further comprising:

a first clutch selectively connecting the second rotational element and the rotational element;

a second clutch selectively connecting the second rotational element and the rotational element;

a third clutch selectively connecting the first rotational element and the rotational element;

a fourth clutch selectively connecting the third rotational element and the rotational element;

a fifth clutch selectively connecting the fifth rotational element and the rotational element;

a first brake selectively connecting the first rotational element and the transmission housing; and a second brake selectively connecting the ninth rotational element and the transmission housing.

* * * * *